UNITED STATES PATENT OFFICE.

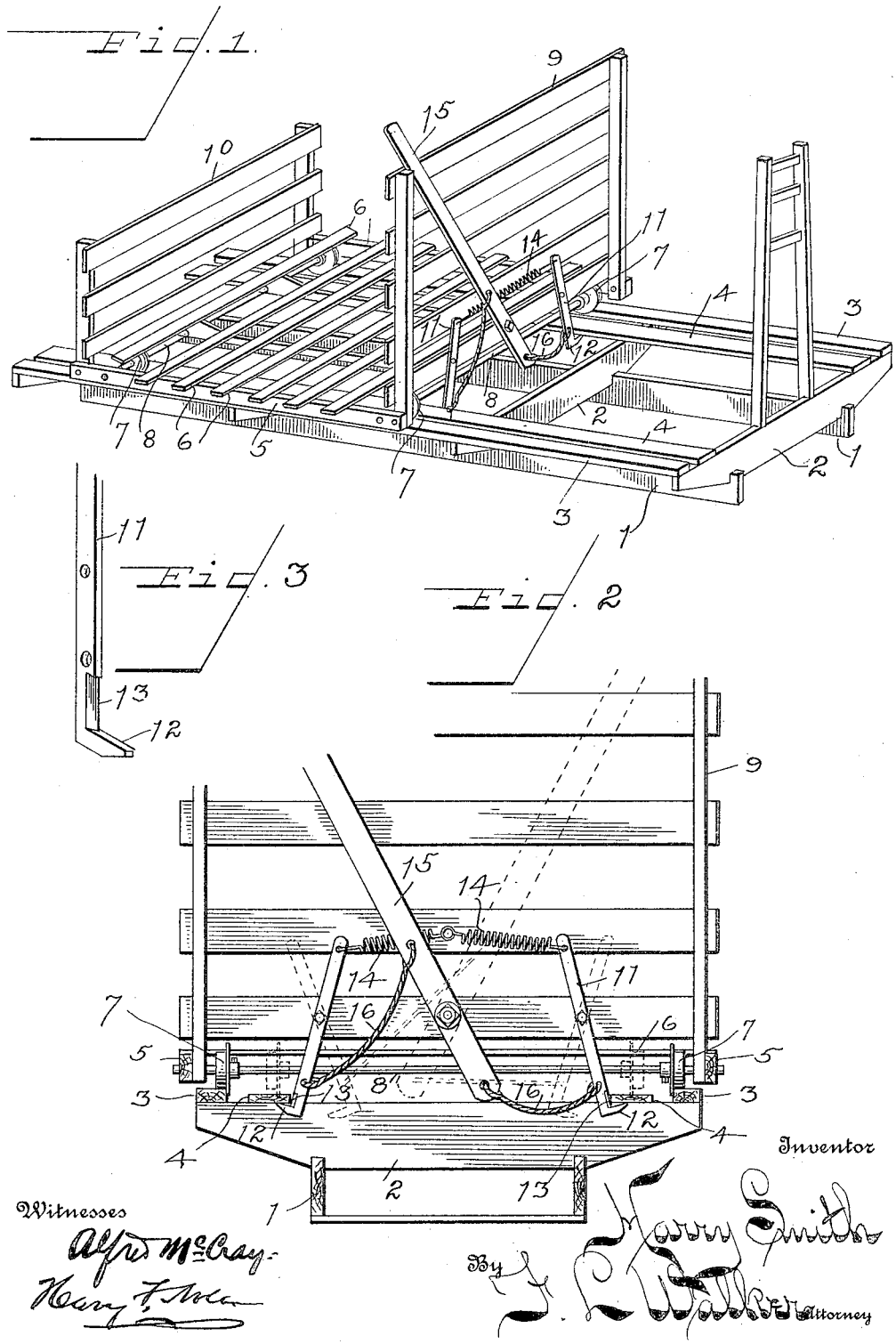

HARRY SMITH, OF NEAR SULPHUR GROVE, OHIO.

HAY-LOADING DEVICE.

1,134,290.  Specification of Letters Patent.  Patented Apr. 6, 1915.

Application filed August 22, 1913.  Serial No. 786,129.

*To all whom it may concern:*

Be it known that I, HARRY SMITH, citizen of the United States, residing near Sulphur Grove, in the county of Montgomery and State of Ohio, have invented certain new and useful Improvements in Hay-Loading Devices, of which the following is a specification.

My invention relates to farm vehicles and particularly to a vehicle bed comprising a rack characterized by a movable truck adapted to be shifted to and fro upon the main body or bed of the structure.

The object of the invention is to provide a device of this character which will be simple in its construction, cheap to manufacture, efficient in use, easily operated and unlikely to get out of repair.

In loading hay or similar growths in the field, particularly when a mechanical loader is used, it is customary to employ several operators upon the wagon to properly distribute the hay and build up the load in such way that it will be properly balanced and that it may be transported without danger of upsetting or collapsing.

By the use of the truck mounted upon the bed or frame as hereinafter described, the load is divided into two sections, enabling a single operator to more rapidly distribute the hay over the limited area defined by the truck and the load is more readily removed by the usual drop fork and hoisting apparatus, since the load is divided in the middle.

A further object of the invention is to provide means for securing the truck in its adjusted position upon the frame or rack and to prevent the displacement of the truck by the jouncing or jolting of the vehicle when returning to the field empty.

With the above primary and other incidental objects in view as will more fully appear in the specification, the invention consists of the features of construction, the parts and combinations thereof and the mode of operation or their equivalents as hereinafter described and set forth in the claims.

Referring to the drawings, Figure 1 is a perspective view of the hay rack or ladder and the movable truck mounted thereon. Fig. 2 is an end elevation of the forward extremity of the truck, showing the locking members engaged with the rack. Fig. 3 is a detail perspective view of one of the locking members.

Like parts are indicated by similar characters of reference throughout the several views.

In constructing the device there is employed the usual hay rack or ladder comprising the longitudinal stringers 1 upon which are carried the transverse ties 2 supporting at their outer extremities the longitudinally disposed parallel bars 3, which form a track for the movable truck. Secured to the ties 2, adjacent to the longitudinal track bars 3 and parallel therewith, are two longitudinally disposed planks 4. There is the usual construction of hay racks as commonly employed for the many years past. Mounted to reciprocate upon the racks thus formed, is a movable truck equal in length to substantially one half the length of the rack. This truck comprises a bed formed from longitudinal bars 5 connected by transverse slats 6 to form the bottom of the truck, which is supported upon flanged carrying wheels 7 engaging and rolling upon the longitudinal track bars 3.

The flanged carrying wheels 7 are adjustably secured upon transverse shafts 8, journaled in the longitudinal bars 5 of the truck bed. The flanged wheels 7 are adjustable to and from each other upon the shaft 8, as shown by dotted lines in Fig. 2, in order that the truck may be adapted to hay racks or ladders of different widths.

At the forward and rearward extremities of the truck bed, there are carried upright end gates 9 and 10. These end gates 9 and 10 are preferably though not necessarily hinged to the bed of the truck where they may be folded to parallelism therewith when not in use.

In using the device, the truck is shifted to the rear end of the rack where it will receive the discharge from an automatic hay loader operated in the rear of the vehicle. The hay is loaded and distributed upon the truck until substantially one half of the desired load is carried thereon. The truck is then shifted to the forward end of the hay rack and the remainder of the load is deposited directly upon the rear portion of the rack.

Inasmuch as the vehicle is in motion during the loading operation it is desirable that the truck be locked in its adjusted position in order that it may not be inadvertently shifted during the loading operation.

Pivoted to the forward end gate 9 of the truck are two oppositely disposed locking members 11, each terminating in a hook like lateral extension 12 and each having on its outer edge, adjacent to the extension 12, a sharpened portion 13. These locking members are so located upon the end gate 9, that upon their outward oscillation the lateral extensions 12 will project beneath the longitudinal planks 4, of the hay rack to prevent the vertical displacement of the trucks by which the carrying wheels 7 might be accidentally disengaged from the track bars 3 while at the same time the sharpened edge portion 13 will engage the edge of the plank 4, as shown in Fig. 2, to prevent the longitudinal displacement of the truck.

In order to forcibly project the locking members into engagement with the longitudinal planks 4 to insure a locking engagement therewith and to maintain such engagement between the locking members and planks, actuating springs 14 are provided which tend to oscillate the locking members 11 outward into engagement with the said planks. The actuating means for the locking members may comprise two independent springs one for each member 11, as shown in Fig. 2 or it may comprise a single spring, having its opposite ends connected to the respective locking members as shown in Fig. 1.

To simultaneously disengage the locking members from the plank 4 there is provided a lever 15 pivoted to the end gate intermediate the locking members 11. Links or connections 16 engaging the locking members 11 at one end and at their opposite ends engaged with the operating lever 15 at the opposite sides of the fulcrum point cause the locking members 11 to be oscillated against the tension of the actuating spring 14 to disengage the locking members from the plank upon the reversal of the operating lever 15. The unlocked position of the several parts are shown by dotted lines in Fig. 2.

By adjusting the carrying wheel 7 to various positions upon the shaft 8, in which positions the wheels are secured by the set screws, the truck may be adjusted to operate upon racks of different widths. The yielding of the locking members 11 against the tension of their spring 14 will be sufficient to compensate for such variation in the width of the ladders or racks without further adjustment of said locking members.

From the above description it will be apparent that there is thus provided a device of the character described, possessing the particular features of advantage before enumerated as desirable, but which obviously is susceptible of modification in its form, proportion, detail construction or arrangement of parts, without departing from the principle involved or sacrificing any of its advantages.

While in order to comply with the statute, the invention has been described in language more or less specific as to certain structural features, it is to be understood that the invention is not limited to any specific details, but that the means and construction herein described comprise but one mode of putting the invention into effect, and the invention is therefore claimed broadly in any of its possible forms or modifications within the scope of the appended claims.

Having thus described my invention, I claim:

1. In a construction as described, a movable truck, a longitudinally disposed bar alined with the path of travel of the truck in relation with which the truck is movable, a pivoted arm carried by the truck, a hook shaped extremity upon the arm, a sharpened edge on said arm adjacent to the hook shaped extremity, the construction and arrangement being such that upon oscillation of the arm the hook shaped extremity thereof will be projected beneath the bar and the sharpened edge will be projected into engagement with the edge of the bar.

2. In a device of the character described, a vehicle bed, a reciprocatory truck mounted thereon, spaced bars carried by the vehicle bed in parallel alinement with the path of travel of the truck, two oppositely disposed locking members carried by the truck, each locking member having a sharpened portion adapted to be engaged with the adjacent bar to prevent reciprocatory movement of the truck and an extension adjacent to the sharpened portion adapted to be projected beneath the bar to prevent vertical disengagement of the truck and bed, and a releasing member common to both locking members.

In testimony whereof, I have hereunto set my hand this 16 day of August, 1913.

HARRY SMITH.

Witnesses:
GAYLORD T. HEINZ,
F. L. WALKER.

Copies of this patent may be obtained for five cents each, by addressing the "Commissioner of Patents Washington, D. C."